(12) United States Patent
Funasaka et al.

(10) Patent No.: US 11,326,588 B2
(45) Date of Patent: May 10, 2022

(54) DIAPHRAGM-TYPE COMPRESSOR, PROJECTOR, COOLER, AND METHOD FOR COMPRESSING FLUID

(71) Applicant: Seiko Epson Corporation, Tokyo (JP)

(72) Inventors: Tsukasa Funasaka, Shiojiri (JP); Yuki Hanamura, Azumino (JP)

(73) Assignee: Seiko Epson Corporation

( * ) Notice: Subject to any disclaimer, the term of this patent is extended or adjusted under 35 U.S.C. 154(b) by 201 days.

(21) Appl. No.: 16/533,838

(22) Filed: Aug. 7, 2019

(65) Prior Publication Data

US 2020/0049141 A1 Feb. 13, 2020

(30) Foreign Application Priority Data

Aug. 8, 2018 (JP) .............................. JP2018-149499

(51) Int. Cl.
*F04B 45/047* (2006.01)
*F04B 43/00* (2006.01)
*F04B 43/04* (2006.01)

(52) U.S. Cl.
CPC ........ *F04B 45/047* (2013.01); *F04B 43/0054* (2013.01); *F04B 43/0081* (2013.01); *F04B 43/04* (2013.01)

(58) Field of Classification Search
CPC ........................... F04B 43/0054; F04B 45/047
USPC .................................. 417/413.2, 413.3, 571
See application file for complete search history.

(56) References Cited

U.S. PATENT DOCUMENTS

| | | | | | |
|---|---|---|---|---|---|
| 2,117,863 | A | * | 5/1938 | Szekely | F04B 43/0054 417/413.1 |
| 2,669,937 | A | * | 2/1954 | Presentey | H02K 33/18 417/413.1 |
| 4,231,287 | A | * | 11/1980 | Smiley | F04B 43/046 92/94 |
| 4,558,995 | A | * | 12/1985 | Furukawa | F04B 43/046 417/413.2 |
| 6,416,294 | B1 | * | 7/2002 | Zengerle | F04B 43/046 417/53 |
| 2011/0079299 | A1 | * | 4/2011 | Yuguchi | F16K 15/16 137/511 |
| 2016/0003228 | A1 | * | 1/2016 | Nonomura | F04B 49/06 417/472 |
| 2018/0223826 | A1 | * | 8/2018 | Jeon | F04B 43/14 |

FOREIGN PATENT DOCUMENTS

| | | | |
|---|---|---|---|
| CN | 202937430 U | * | 5/2013 |
| JP | H10-115298 A | | 5/1998 |
| JP | 2002-106468 A | | 4/2002 |
| JP | 2011-256741 A | | 12/2011 |
| WO | WO 2004/076862 A1 | * | 12/2003 |

* cited by examiner

*Primary Examiner* — Charles G Freay
(74) *Attorney, Agent, or Firm* — Harness, Dickey & Pierce, P.L.C.

(57) ABSTRACT

A diaphragm-type compressor includes a substrate, a diaphragm, and an actuator, the substrate, the diaphragm, and the actuator being laminated and provided in this order. In a plan view from a direction of the lamination, the diaphragm includes a first film section that overlaps the actuator and a second film section that does not overlap the actuator. A step is provided on a surface at the diaphragm side of the substrate. A portion corresponding to the first film section and a portion corresponding to the second film section of the substrate are respectively different stages.

5 Claims, 7 Drawing Sheets

DIAPHRAGM-TYPE COMPRESSOR, PROJECTOR, COOLER, AND METHOD FOR COMPRESSING FLUID

The present application is based on, and claims priority from, JP Application Serial Number 2018-149499, filed Aug. 8, 2018, the disclosure of which is hereby incorporated by reference herein in its entirety.

BACKGROUND

1. Technical Field

The present disclosure relates to a diaphragm-type compressor, a projector, a cooler, and a method for compressing fluid.

2. Related Art

Various compressors have been used. Among such compressors, there is a diaphragm-type compressor that includes a diaphragm, a suction valve, and a discharge valve and causes the diaphragm to reciprocate to transfer fluid.

For example, JP-A-2002-106468 (Patent Literature 1) discloses a diaphragm pump that includes a diaphragm and film pieces functioning as a suction valve and a discharge valve and causes the diaphragm to reciprocate to transfer fluid.

In recent years, compressors have been sometimes used in various uses and apparatuses. It is sometimes requested to feed fluids having different compression ratios with one compressor. However, the diaphragm pump disclosed in Patent Literature 1 cannot feed fluids having different compression ratios with one compressor.

JP-A-10-115298 (Patent Literature 2) discloses a multi-shaft multi-stage combined compressor, which is a compressor in which compression shafts are multiple shafts in multiple stages. The multi-shaft multi-stage combined compressor disclosed in Patent Literature 2 is capable of feeding fluids having different compression ratios with one compressor. However, the multi-shaft multi-stage combined compressor disclosed in Patent Literature 2 has complicated structure and is not easily reduced in size. Therefore, there is a demand for a compressor having a simple configuration that can be reduced in size.

SUMMARY

A diaphragm-type compressor according to an aspect of the present disclosure includes: a substrate; a diaphragm; and an actuator, the substrate, the diaphragm, and the actuator being laminated and provided in this order. In a plan view from a direction of the lamination, the diaphragm includes a first film section that overlaps the actuator and a second film section that does not overlap the actuator. A step is provided on a surface at the diaphragm side of the substrate. A distance between the diaphragm and the substrate at a time when the actuator is not operating is larger in a region of the substrate corresponding to the first film section than a region of the substrate corresponding to the second film section.

BRIEF DESCRIPTION OF THE DRAWINGS

FIG. 2 is a schematic diagram showing the diaphragm-type compressor according to the first embodiment of the present disclosure and is a perspective view of a state in which a frame is partially seen through.

DESCRIPTION OF EXEMPLARY EMBODIMENTS

Figure 1:
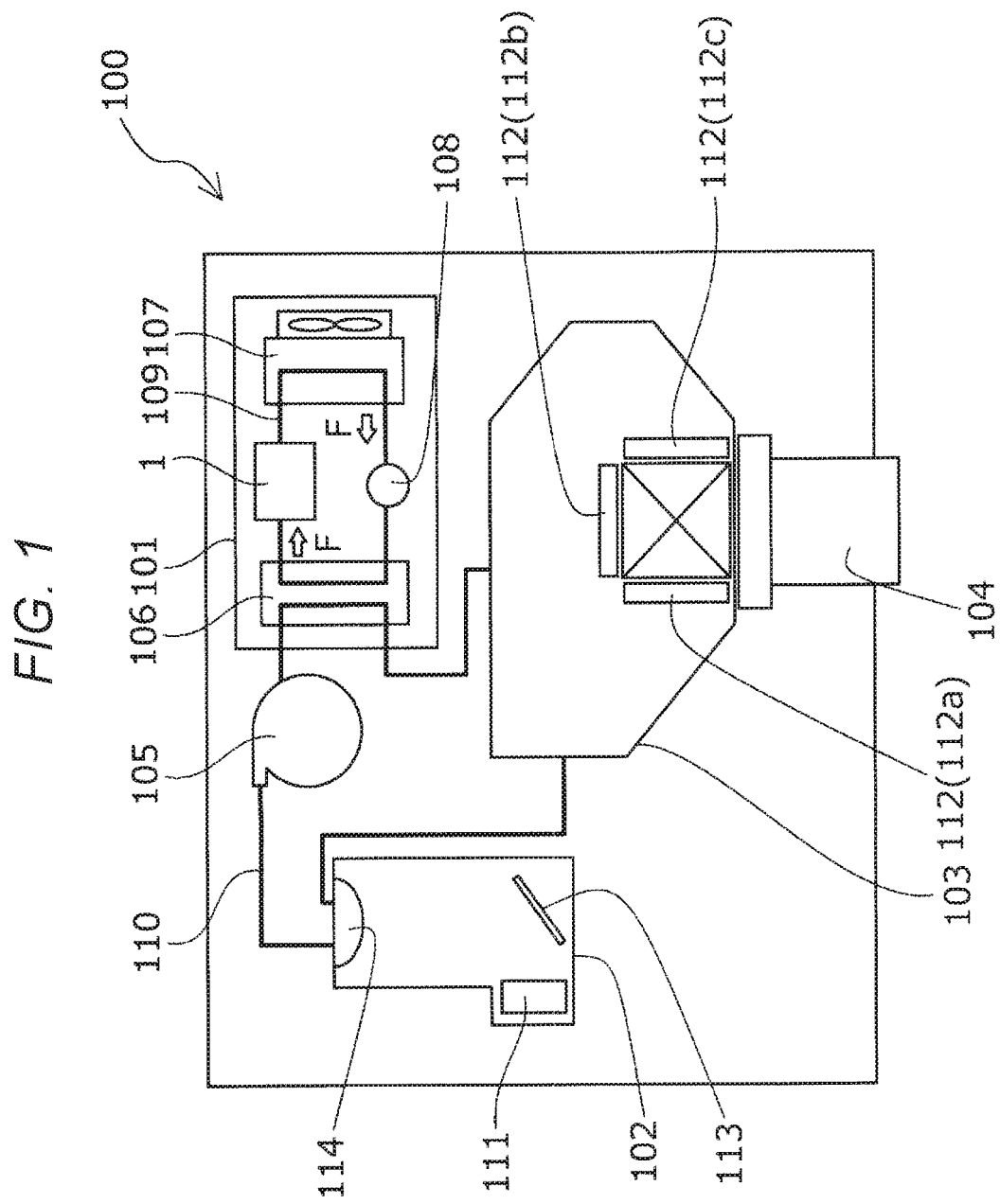
FIG. 1 is a schematic diagram showing an example of use of a diaphragm-type compressor according to a first embodiment of the present disclosure.

First, the present disclosure is schematically explained.

A diaphragm-type compressor according to a first aspect of the present disclosure includes: a substrate; a diaphragm; and an actuator, the substrate, the diaphragm, the actuator being laminated and provided in this order. In a plan view from a direction of the lamination, the diaphragm includes a first film section that overlaps the actuator and a second film section that does not overlap the actuator. A step is provided on a surface on the diaphragm side of the substrate. A distance between the diaphragm and the substrate at a time when the actuator is not operating is larger in a region of the substrate corresponding to the first film section than a region of the substrate corresponding to the second film section.

According to this aspect, the diaphragm-type compressor has a simple single-shaft multi-stage configuration in which a rate of change of the volume of a compression chamber can be changed by changing a distance in which the diaphragm is displaced by driving of the actuator. It is possible to compress fluid at a different compression ratio by changing the distance of the displacement of the diaphragm according to a requested compression ratio of the fluid.

In a second aspect of the present disclosure, in the diaphragm-type compressor according to the first aspect, in a direction in which the actuator operates, the actuator, the second film section, and at least one of a suction valve and a discharge valve may be provided in overlapping positions.

According to this aspect, in a pressing direction, the actuator, the second film section, and at least one of the suction valve and the discharge valve are provided in the overlapping positions. Therefore, it is possible to simply configure the diaphragm-type compressor capable of compressing the fluid at a different compression ratio. It is possible to effectively perform compression of the fluid during second pressing execution. It is possible to effectively perform at least one of inflow of the fluid into the compression chamber and outflow of the fluid from the compression chamber.

In a first aspect, a second aspect, and a third aspect of the present disclosure, in the diaphragm-type compressor, the actuator may be a piezoelectric element.

According to this aspect, it is possible to simply configure the piezoelectric element that can finely set a pressurizing force by controlling an applied voltage to the actuator. It is possible to simply configure the diaphragm-type compressor capable of compressing the fluid at a different compression ratio.

In a fourth aspect of the present disclosure, in the diaphragm-type compressor according to any one of the first to third aspects, a region pressed by the actuator in the diaphragm may be thicker in a direction in which the actuator operates than a region not pressed by the actuator in the diaphragm.

According to this aspect, the region pressed by the actuator in the diaphragm is thicker in the direction in which the actuator operates than the region not pressed by the actuator in the diaphragm. Therefore, the region pressed by the actuator can be configured robust. It is possible to prevent the region pressed by the actuator from being damaged by being pressed by the actuator.

A cooler according to a fifth aspect of the present disclosure includes: the diaphragm-type compressor according to any one of the first to fourth aspects; a heat exchanging section configured to radiate heat of a coolant that rises in temperature by being compressed by the diaphragm-type compressor; and a coolant expanding section configured to expand the coolant.

According to this aspect, it is possible to control a compression ratio of the coolant in the diaphragm-type compressor according to, for example, heat radiation efficiency in the heat exchanging section.

A projector according to a sixth aspect of the present disclosure includes the cooler according to the fifth aspect.

According to this aspect, it is possible to configure the projector small and cool the inside of the projector in a plurality of states.

A method for compressing fluid according to a seventh aspect of the present disclosure is a method for compressing fluid using a diaphragm-type compressor including a diaphragm, an actuator configured to apply a force to the diaphragm, and a substrate configuring a compression chamber in conjunction with the diaphragm, the method comprising selecting and executing, according to a requested compression ratio of the fluid, first pressing for causing the actuator to press the diaphragm for a first distance to reduce a volume of the compression chamber into which the fluid is led and second pressing for causing the actuator to press the diaphragm for a second distance longer than the first distance to reduce, more greatly than when the first pressing is executed, the volume of the compression chamber into which the fluid is led.

According to this aspect, the method selects and executes, according to the requested compression ratio of the fluid, the first pressing for causing the actuator to press the diaphragm for the first distance to reduce the volume of the compression chamber into which the fluid is led and the second pressing for causing the actuator to press the diaphragm for the second distance longer than the first distance to reduce, more greatly than when the first pressing is executed, the volume of the compression chamber into which the fluid is led. Therefore, it is possible to compress the fluid at a different compression ratio according to the requested compression ratio of the fluid.

Diaphragm-type compressors according to embodiments of the present disclosure are explained in detail below with reference to the accompanying drawings.

First Embodiment (FIGS. 1 to 5)

A diaphragm-type compressor 1 according to a first embodiment of the present disclosure is explained.

First, a projector 100, which is an example of an apparatus including the diaphragm-type compressor 1 according to the first embodiment of the present disclosure, is explained with reference to FIG. 1.

The projector 100 shown in FIG. 1 includes a light source unit 102 including a light source 114, a phosphor 111, and a dichroic mirror 113. The projector 100 includes an optical element unit 103 including an optical element 112 including an optical element 112a for red light, an optical element 112b for green light, and an optical element 112c for blue light and a projection lens 104. The projector 100 includes a cooler 101 for cooling the light source unit 102 and the optical element unit 103.

The cooler 101 includes the diaphragm-type compressor 1 according to this embodiment, details of which are explained below, a heat exchanging section 107, a coolant expanding section 108, and an evaporator 106. The cooler 101 is configured such that a primary coolant flows in a direction F in a primary coolant pipe 109. Since such a configuration is adopted, the cooler 101 can control a compression ratio of the primary coolant in the diaphragm-type compressor 1 according to, for example, heat radiation efficiency in the heat exchanging section 107.

The primary coolant is compressed by the diaphragm-type compressor 1 and rises in temperature. The primary coolant more greatly rises in temperature as the compression ratio of the primary coolant in the diaphragm-type compressor 1 is larger. The primary coolant flowing into the diaphragm-type compressor 1 is low-pressure gas. The primary coolant flowing out from the diaphragm-type compressor 1 is high-pressure gas.

The primary coolant compressed by the diaphragm-type compressor 1 is cooled to a predetermined temperature by the heat exchanging section 107. The primary coolant cooled by the heat exchanging section 107 is high-pressure liquid.

The primary coolant cooled by the heat exchanging section 107 is expanded by the coolant expanding section 108 and the temperature of the primary coolant drops. The primary coolant expanded by the coolant expanding section 108 is low-pressure liquid. The temperature of the primary coolant more greatly drops as the compression ratio in the diaphragm-type compressor 1 is larger, that is, an expansion ratio in the coolant expanding section 108 is larger.

The evaporator 106 changes the primary coolant from liquid to gas on the inside of the evaporator 106 and absorbs heat on the inside of the evaporator 106. The light source unit 102, the optical element unit 103, and the cooler 101 are coupled by a secondary coolant pipe 110. A secondary coolant is circulated in the secondary coolant pipe 110 by a liquid feeding pump 105. The primary coolant pipe 109 and the secondary coolant pipe 110 are disposed side by side on the inside of the evaporator 106 of the cooler 101. Since the evaporator 106 has such an internal configuration, the secondary coolant is cooled on the inside of the evaporator 106, the temperature of which drops because the primary coolant is changed from liquid to gas. The cooled secondary coolant circulates in the light source unit 102 and the optical element unit 103, whereby the light source unit 102 and the optical element unit 103 are cooled.

As explained above, the diaphragm-type compressor 1 according to this embodiment can be suitably used in the projector 100. Since the projector 100 shown in FIG. 1 includes the diaphragm-type compressor 1 according to this embodiment explained in detail below, the projector 100 is small and configured to be able to cool the inside in a plurality of states.

However, the diaphragm-type compressor of the present disclosure is not limited to the use in the projector and can be used in an apparatus or the like including a constituent member that generates heat such as a printer, a computer (a notebook personal computer, a desktop computer, etc.), and a robot.

The configuration of the diaphragm-type compressor 1 is explained in detail with reference to FIGS. 2 to 5.

Figure 2:
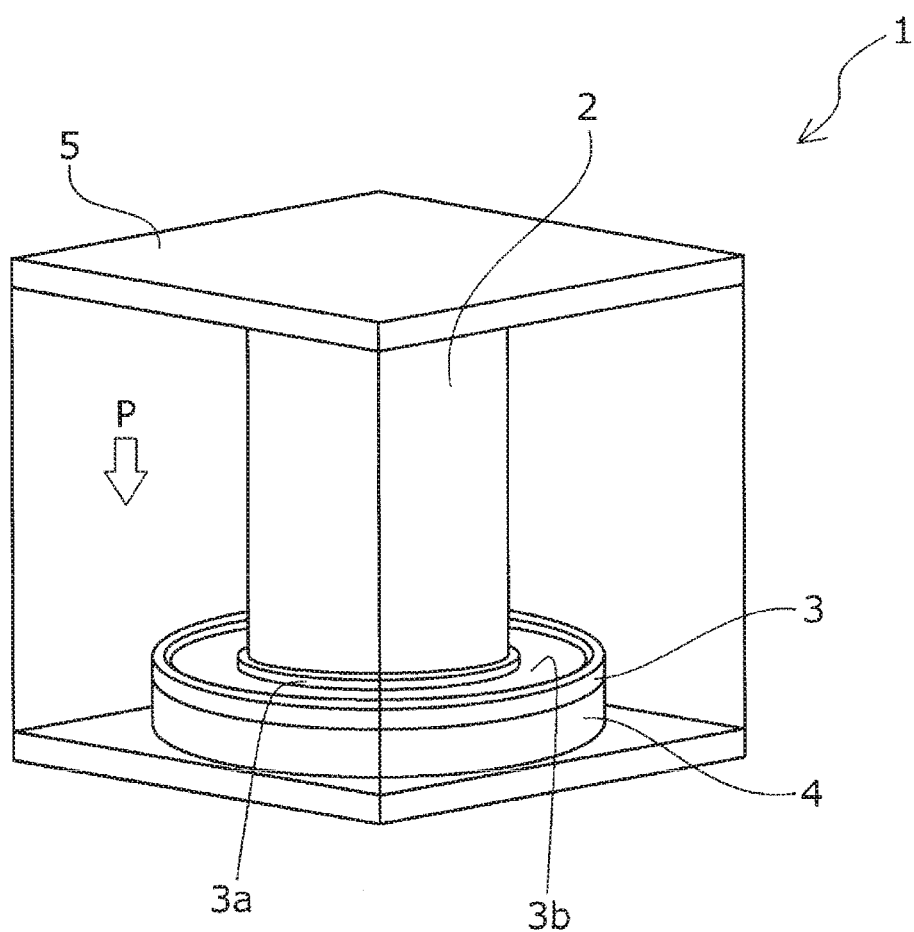

As shown in FIG. 2 and the like, the diaphragm-type compressor 1 according to this embodiment includes an actuator 2, a diaphragm 3 coupled to the actuator 2, a substrate 4 coupled to the diaphragm 3, and a frame 5 that covers the actuator 2, the diaphragm 3, and the substrate 4. The actuator 2 according to this embodiment is a piezoelectric element and is coupled to a not-shown amplifier coupled to a not-shown signal generator. The actuator 2 is configured to be capable of pressing the diaphragm 3 in a pressing direction P by driving the signal generator and the amplifier. A driving wave motion of the actuator 2 by the signal generator and the amplifier can be, for example, a Sin wave. The pressing direction P corresponds to a direction in which the actuator 2 operates, in other words, a direction in which the diaphragm 3 is displaced according to the driving of the actuator 2.

Figure 3:
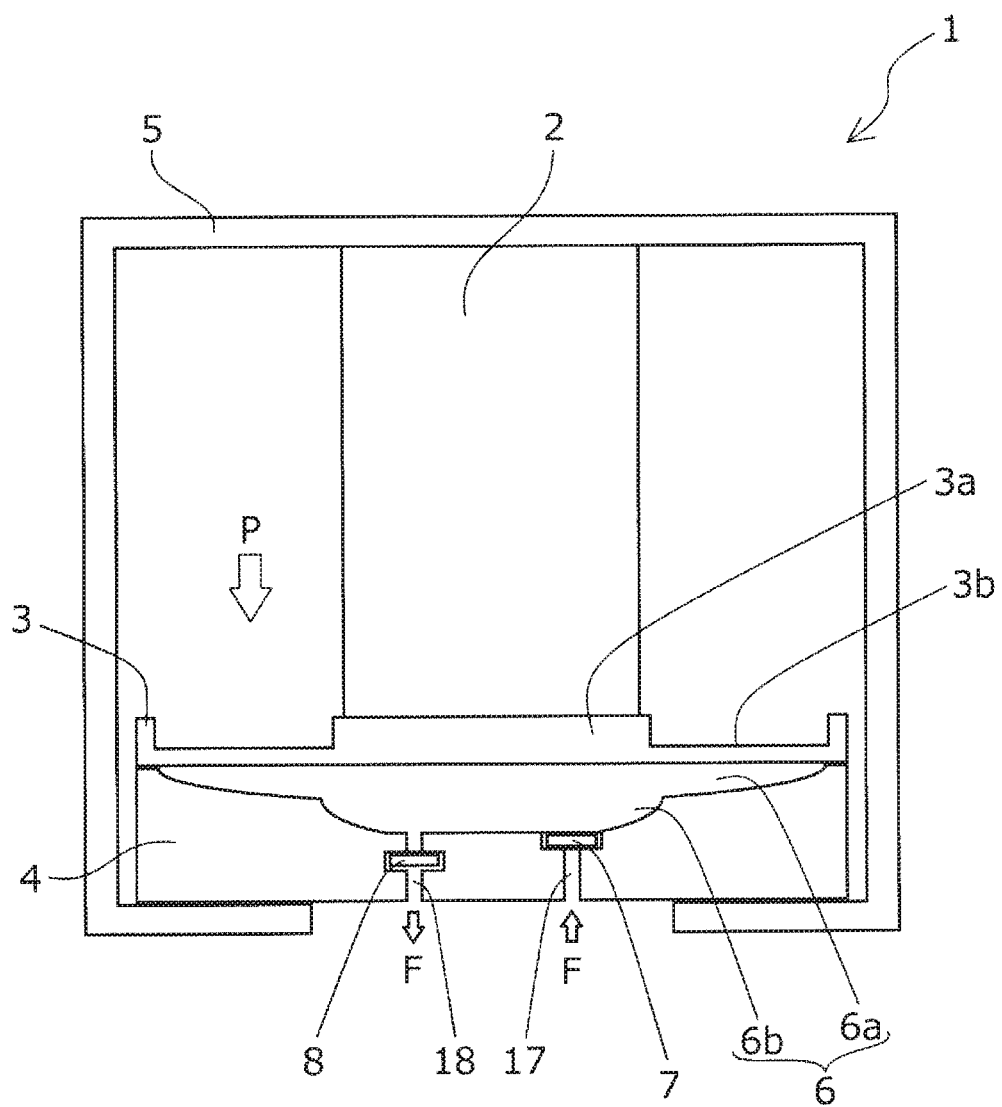
FIG. 3 is a schematic diagram showing the diaphragm-type compressor according to the first embodiment of the present disclosure and is a sectional view showing a state in which an actuator is not pressing a diaphragm.

As shown in FIG. 3 and the like, in the pressing direction P, the diaphragm 3 is configured thicker in a region 3a pressed by the actuator 2 than a region 3b not pressed by the actuator 2. "The region 3a pressed by the actuator 2 is thicker in the pressing direction P than the region 3b not pressed by the actuator 2" means that at least a part of a position pressed by the actuator 2 only has to be thicker in the pressing direction P than at least a part of a position not pressed by the actuator 2. The region 3a can be represented as a first film section that overlaps the actuator 2. The region 3b can be represented as a second film section that does not overlap the actuator 2.

As shown in FIG. 3 and the like, in the substrate 4, a hollow having a two-stage configuration is formed on a side coupled to the diaphragm 3. The diaphragm 3 and the substrate 4 form a compression chamber 6. The compression chamber 6 includes a first space 6a in which the distance between the diaphragm 3 and the substrate 4 is short in the pressing direction P and a second space 6b in which the distance between the diaphragm 3 and the substrate 4 is longer in the pressing direction P than in the first space 6a.

In a position overlapping the second space 6b in the pressing direction P in the substrate 4, a sucking section 17 for enabling the primary coolant, which is fluid, to flow into the compression chamber 6 is formed. A suction valve 7 is formed in the sucking section 17. The suction valve 7 is capable of changing a position in the pressing direction P between when the primary coolant is allowed to flow into the compression chamber 6 and when the primary coolant is not allowed to flow into the compression chamber 6. The suction valve 7 changes the position in the pressing direction P to allow the primary coolant to flow in only the direction F and prevent the primary coolant from flowing back.

In a position overlapping the second space 6b in the pressing direction P in the substrate 4, a discharging section 18 for enabling the primary coolant, which is the fluid, from flowing out from the compression chamber 6 is formed. A discharge valve 8 is formed in the discharging section 18. The discharge valve 8 is capable of changing a position in the pressing direction P between when the primary coolant is allowed to flow out from the compression chamber 6 and when the primary coolant is not allowed to flow out from the compression chamber 6. The discharge valve 8 changes the position in the pressing direction P to allow the primary coolant to flow in only the direction F and prevent the primary coolant from flowing back.

In the diaphragm-type compressor 1 according to this embodiment, the suction valve 7 and the discharge valve 8 are provided in a boundary portion between the primary coolant pipe 109 and the compression chamber 6 in order to reduce a loss in feeding the primary coolant increased in pressure in the compression chamber 6 to a downstream in the direction F. In other words, the suction valve 7 and the discharge valve 8 are provided in the substrate 4 and disposed to configure a part of the compression chamber 6. That is, the suction valve 7 and the discharge valve 8 are not provided in a place where the pressure of the primary coolant is not high.

The substrate 4 is formed by stacking a plurality of tabular materials along the pressing direction P and joining the plurality of tabular materials. However, the configuration of the substrate 4 is not limited to such a configuration.

A state change of the diaphragm-type compressor 1 involved in the compression of the primary coolant is explained with reference to FIGS. 3 to 5. The diaphragm-type compressor 1 according to this embodiment is configured to be capable of setting the compression ratio of the primary coolant to two kinds of compression ratios, that is, a low compression ratio and a high compression ratio.

FIG. 3 shows a state before the compression of the primary coolant. In FIG. 3, the primary coolant is filled in the compression chamber 6. As shown in FIG. 3, in the state before the compression of the primary coolant, the actuator 2 does not press the diaphragm 3 in the pressing direction P. The compression chamber 6 is in a wide state in which the compression chamber 6 includes the first space 6a and the second space 6b.

Figure 4:
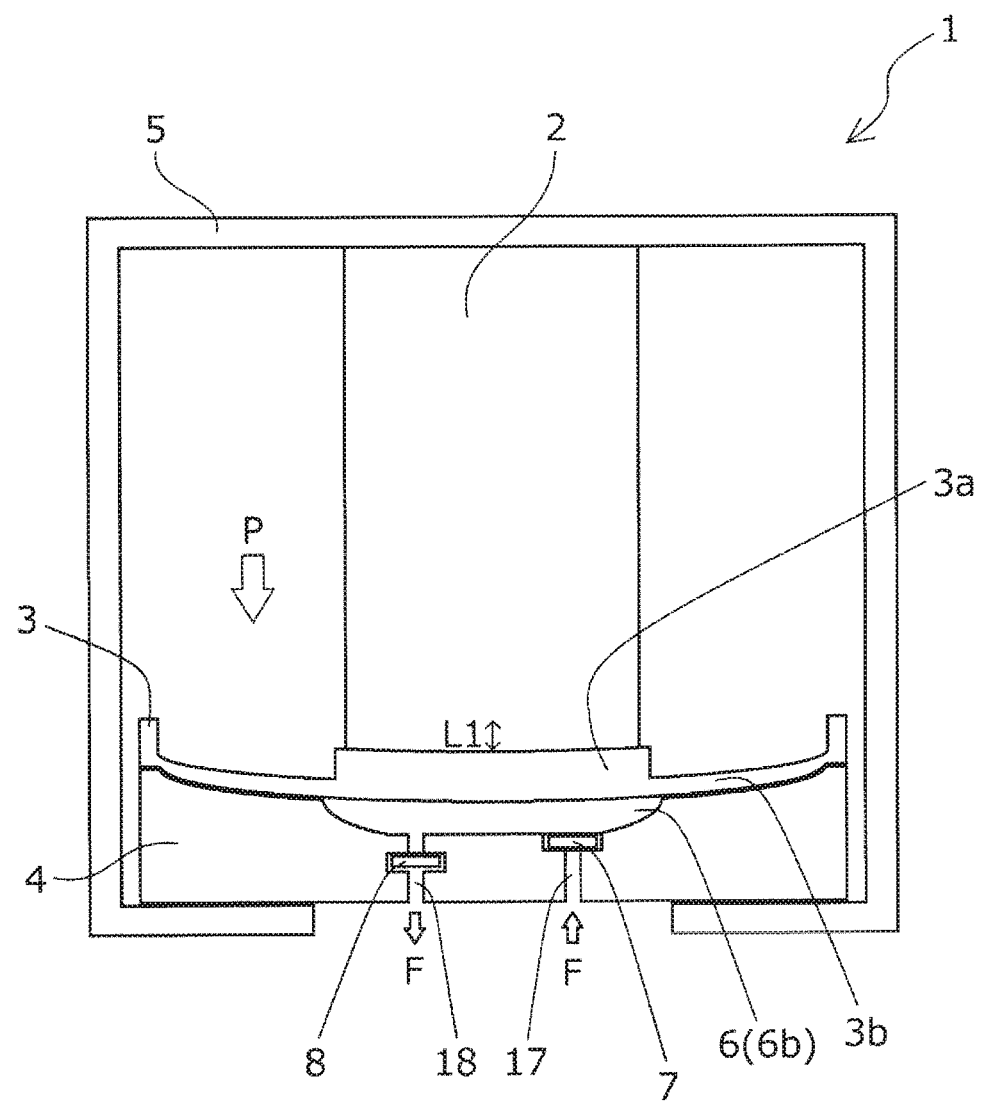
FIG. 4 is a schematic diagram showing the diaphragm-type compressor according to the first embodiment of the present disclosure and is a sectional view showing a state in which the actuator is pressing the diaphragm for a first distance.

FIG. 4 shows a first pressing state in which the actuator 2 is driven to compress the primary coolant at a low compression ratio from the state shown in FIG. 3. In the first pressing, the actuator 2 presses the diaphragm 3 for a first distance L1. As shown in FIG. 4, in the first pressing state in which the primary coolant is compressed at the low compression ratio, the actuator 2 presses the diaphragm 3 in the pressing direction P. The diaphragm 3 enters the inside of the compression chamber 6. The compression chamber 6 is in a state in which the compression chamber 6 generally includes only the second space 6b.

Figure 5:
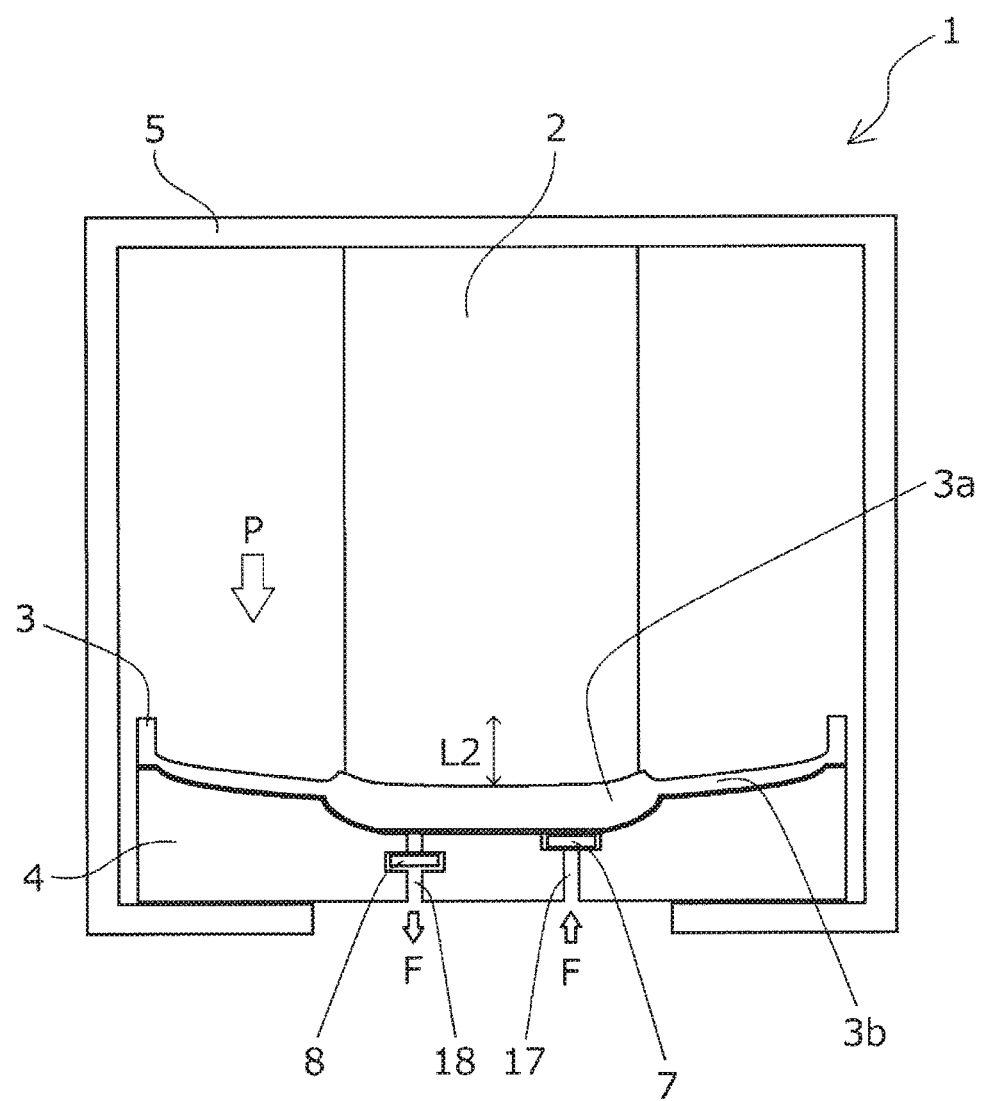
FIG. 5 is a schematic diagram showing the diaphragm-type compressor according to the first embodiment of the present disclosure and is a sectional view showing a state in which the actuator is pressing the diaphragm for a second distance.

FIG. 5 shows a second pressing state in which the actuator 2 is driven to compress the primary coolant at a high compression ratio from the state shown in FIG. 3. In the second pressing, the actuator 2 presses the diaphragm 3 for a second distance L2 longer than the first distance L1. As shown in FIG. 5, in the second pressing state in which the primary coolant is compressed at the high compression ratio, the actuator 2 presses the diaphragm 3 in the pressing direction P. The diaphragm 3 deeply enters the inside of the compression chamber 6 to reach the second space 6b. The compression chamber 6 is extremely small.

In the diaphragm-type compressor 1 according to this embodiment, a step is formed in the compression chamber 6 as shown in FIG. 3 and the like. The diaphragm-type compressor 1 is configured such that the first space 6a for securing a wide internal space of the compression chamber 6 and a second space 6b for increasing the pressure in the internal space of the compression chamber 6 can be clearly distinguished. However, if the diaphragm-type compressor 1 is capable of realizing the first pressing state in which the actuator 2 is driven for the first distance L1 to compress the primary coolant at the low compression ratio and the second pressing state in which the actuator 2 is driven for the second distance L2 longer than the first distance L1 to compress the primary coolant at the high compression ratio, the diaphragm-type compressor 1 may have a configuration in which the first space 6a and the second space 6b cannot be clearly distinguished.

To once summarize the above, the diaphragm-type compressor 1 according to this embodiment includes the substrate 4, the diaphragm. 3, and the actuator 2 laminated and provided in this order. In a plan view from the direction of the lamination, the diaphragm 3 includes the region 3a, which is the first film section, overlapping the actuator 2, and the region 3b, which is the second film section, not overlapping the actuator 2. The step is provided on the surface on the diaphragm 3 side of the substrate 4. A portion corresponding to the region 3a and a portion corresponding to the region 3b on the substrate 4 are respectively different stages.

In other words, the diaphragm-type compressor 1 according to this embodiment includes the diaphragm 3, the actuator 2 capable of pressing the diaphragm 3, the substrate 4 provided at the opposite side of the actuator 2 with respect to the diaphragm 3 as shown in FIG. 3 and the like and forming the compression chamber 6 in conjunction with the actuator 2, the suction valve 7 provided in the substrate 4, and the discharge valve 8 provided in the substrate 4. The actuator 2 is capable of executing the first pressing for pressing the diaphragm 3 for the first distance L1 to reduce the volume of the compression chamber 6 and the second pressing for pressing the diaphragm 3 for the second distance L2 longer than the first distance L1 to more greatly reduce the volume of the compression chamber 6 than when the first pressing is executed.

As shown in FIGS. 3 to 5, the diaphragm-type compressor 1 according to this embodiment has a simple single-shaft multi-stage configuration in which a rate of change of the volume of the compression chamber 6 can be changed by changing the distance of the displacement of the diaphragm 3 by driving of the actuator 2 to the first distance L1 or the second distance L2. The diaphragm-type compressor 1 according to this embodiment is capable of compressing the fluid at a different compression ratio by changing the distance of the displacement of the diaphragm 3 to the first distance L1 or the second distance L2 according to a requested compression ratio of the fluid.

From the viewpoint of a method for compressing the primary coolant (the fluid), concerning the above explanation, it is possible to execute the following method for compressing fluid using the diaphragm-type compressor 1 according to this embodiment including the diaphragm 3, the actuator 2 that applies a force to the diaphragm 3, and the substrate 4 provided at the opposite side of the actuator 2 with respect to the diaphragm 3 and configuring the compression chamber 6 in conjunction with the actuator 2. The method selects and executes, according to a requested compression ratio of the fluid, the first pressing for causing the actuator 2 to press the diaphragm 3 for the first distance L1 to reduce the volume of the compression chamber 6 into which the fluid is led and the second pressing for causing the actuator 2 to press the diaphragm 3 for the second distance L2 longer than the first distance L1 to reduce, more greatly than when the first pressing is executed, the volume of the compression chamber 6 into which the fluid is led.

In this way, it is possible to compress the fluid at a different compression ratio according to a requested compression ratio of the fluid by selecting and executing, according to the requested compression ratio of the fluid, the first pressing for causing the actuator 2 to press the diaphragm 3 for the first distance L1 to reduce the volume of the compression chamber 6 into which the fluid is led and the second pressing for causing the actuator 2 to press the diaphragm 3 for the second distance L2 longer than the first distance L1 to reduce, more greatly than when the first pressing is executed, the volume of the compression chamber 6 into which the fluid is led.

As explained above, in the diaphragm-type compressor 1 according to this embodiment, the compression chamber 6 includes the first space 6a in which the distance between the diaphragm 3 and the substrate 4 is short in the pressing direction P of the actuator 2 and the second space 6b in which the distance between the diaphragm 3 and the substrate 4 is longer in the pressing direction P than in the first space 6a. The actuator 2, the region 3b, the second space 6b, and the suction valve 7, and the discharge valve 8 are provided in overlapping positions in the pressing direction P.

As in the diaphragm-type compressor 1 according to this embodiment, the actuator 2, the region 3b, the second space 6b, and at least one of the suction valve 7 and the discharge valve 8 are provided in overlapping positions in the pressing direction P. Consequently, it is possible to simply configure the diaphragm-type compressor 1 capable of compressing the fluid at a different compression ratio. By providing the suction valve 7 and the discharge valve 8 in such a high-pressure portion, it is possible to effectively perform compression of the primary coolant during the second pressing execution. It is possible to effectively perform at least one of inflow of the primary coolant into the compression chamber 6 and outflow of the primary coolant from the compression chamber 6.

As explained above, in the diaphragm-type compressor 1 according to this embodiment, the actuator 2 is the piezoelectric element. Therefore, since the actuator 2 is simply configured by the piezoelectric element, the diaphragm-type compressor 1 capable of compressing the primary coolant at a different compression ratio is simply configured.

As explained above, in the diaphragm-type compressor 1 according to this embodiment, the region 3a pressed by the actuator 2 in the diaphragm 3 is thickener in the pressing direction P than the region 3b not pressed by the actuator 2 in the diaphragm 3. Therefore, in the diaphragm-type compressor 1 according to this embodiment, the region 3a pressed by the actuator 2 is configured robust. The region 3a pressed by the actuator 2 is prevented from being damaged by being pressed by the actuator 2. Since the region 3a pressed by the actuator 2 is formed thick, it is possible to improve accuracy of the displacement of the diaphragm 3 in the pressing direction P.

Figure 6:
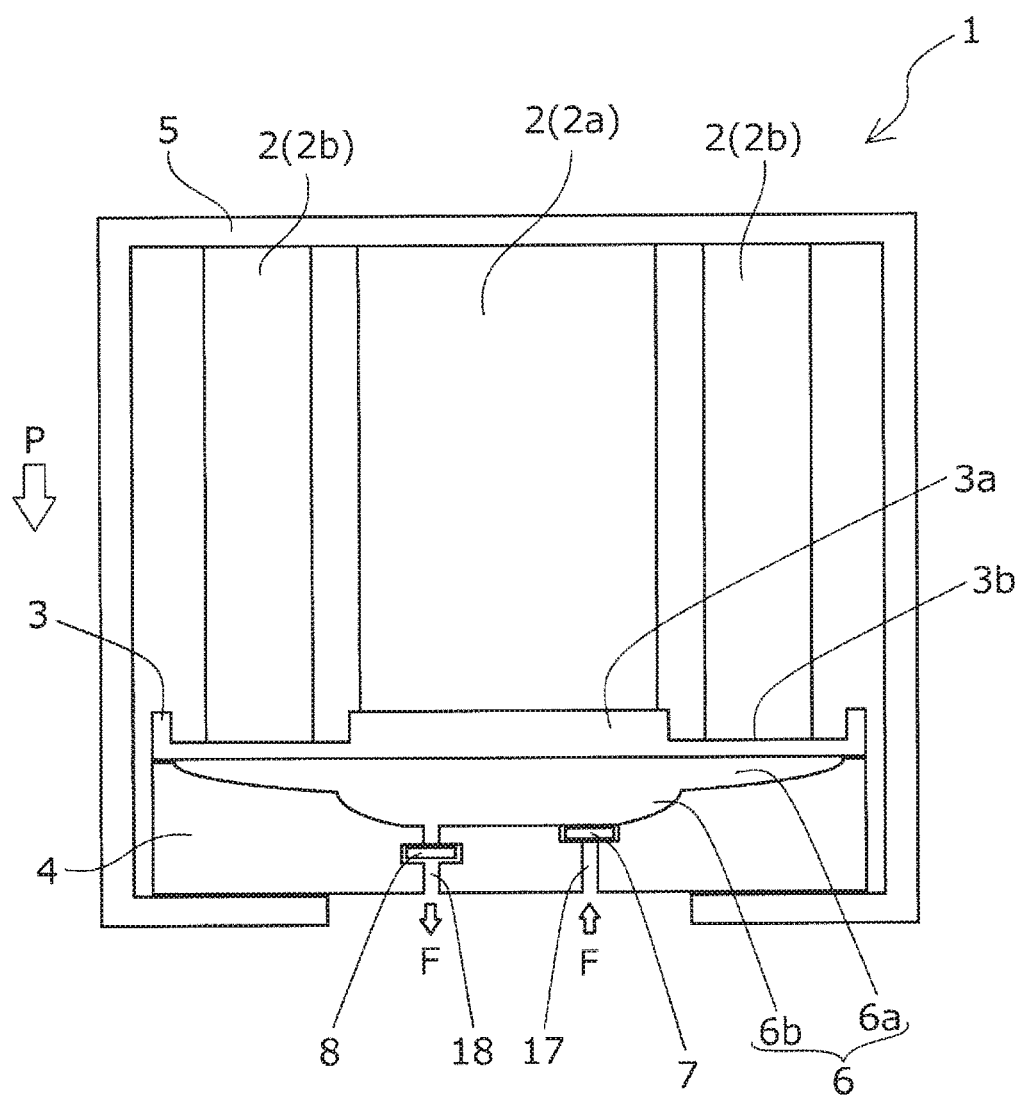
FIG. 6 is a schematic diagram showing a diaphragm-type compressor according to a second embodiment of the present disclosure and is a sectional view showing a state in which an actuator is not pressing a diaphragm.
Figure 7:
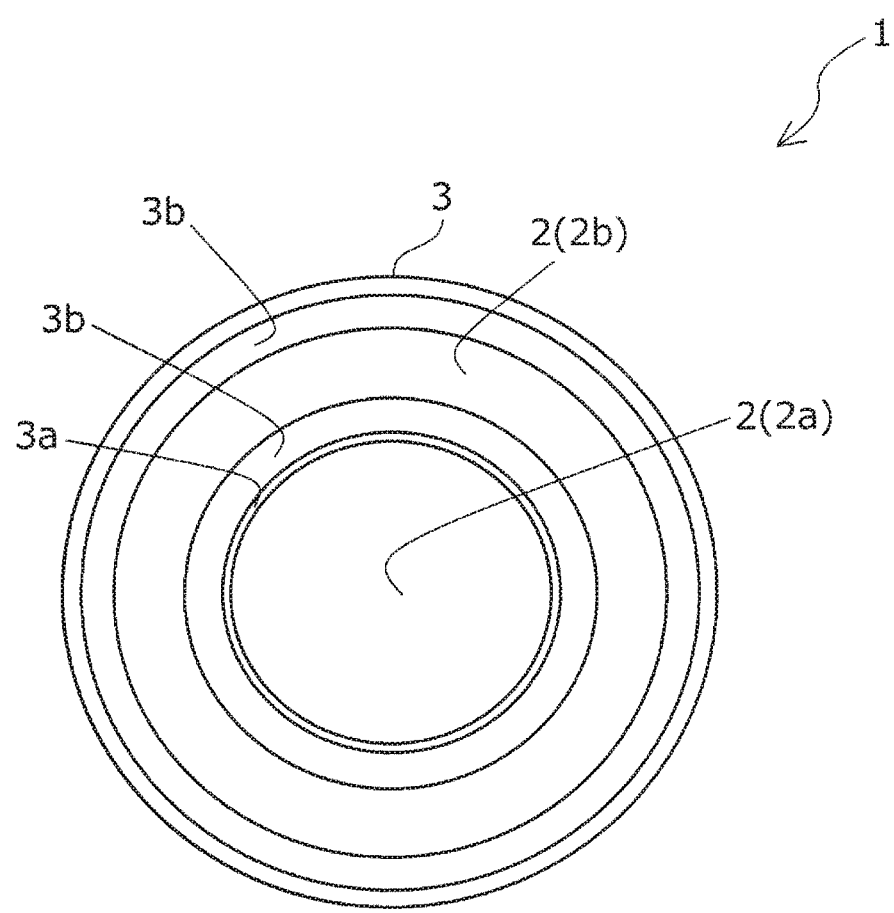
FIG. 7 is a schematic diagram showing the diaphragm-type compressor according to the second embodiment of the present disclosure and is a plan view of a state in which a frame is removed.

Second Embodiment (FIGS. 6 and 7)

The diaphragm-type compressor 1 according to a second embodiment of the present disclosure is explained with reference to FIGS. 6 and 7. FIG. 6 is a diagram corresponding to FIG. 3 showing the diaphragm-type compressor 1 according to the first embodiment. Constituent members common to the first embodiment are denoted by the same reference numerals and signs. Detailed explanation of the constituent members is omitted. The diaphragm-type compressor 1 according to this embodiment has the same configuration as the diaphragm-type compressor 1 according to the first embodiment except the configuration of the actuator 2.

As shown in FIGS. 6 and 7, the diaphragm-type compressor 1 according to this embodiment includes an annular actuator 2b around an actuator 2a having the same configuration as the configuration of the actuator 2 of the diaphragm-type compressor 1 according to the first embodiment. The actuator 2b is provided in a position overlapping the first space 6a in the pressing direction P. By adopting such a configuration, the diaphragm-type compressor 1 according to this embodiment is capable of more effectively compressing the primary coolant than the diaphragm-type compressor 1 according to the first embodiment.

The present disclosure is not limited to the embodiments explained above. Various modifications are possible within the scope of the inventions described in the claims. It goes without saying that the modifications are also included in the scope of the present disclosure. For example, the actuator is not limited to the piezoelectric element and can be transformed into a motor, a solenoid, a voice coil motor, and the like, which are included in the scope of the present disclosure.

What is claimed is:

1. A diaphragm-type compressor comprising:
a substrate having a first recess and a second recess, a first bottom of the first recess being located further away from a bottom surface of the substrate than a second bottom of the second recess, a step being formed at a border between the first recess and the second recess, each of the first and second recesses being arc-shaped;
a diaphragm located above the first recess and the second recess of the substrate, the diaphragm having a first face and a second face outwardly opposite to each other, the first face facing the substrate, the diaphragm being configured with a first film section and a second film section, a thickness of the first film section being larger than a thickness of the second film section, the first face being flat when no pressure is applied to the diaphragm; and
an actuator having a third face and a fourth face outwardly opposite to each other,
wherein an entirety of the third face of the actuator is placed on the second face of the first film section of the diaphragm, and the actuator being configured to press the diaphragm along a first direction,
the substrate, the diaphragm, and the actuator are stacked in the first direction,
the actuator, the first film section, and the second recess are aligned along the first direction, and
an entirety of the second film section is laterally shifted from the actuator when viewed in the first direction.

2. The diaphragm-type compressor according to claim 1, wherein the actuator and at least one of a suction valve and a discharge valve are aligned along the first direction.

3. The diaphragm-type compressor according to claim 1, wherein the actuator is a piezoelectric element.

4. A cooler comprising:
the diaphragm-type compressor according to claim 1;
a heat exchanging section configured to radiate heat of a coolant that rises in temperature by being compressed by the diaphragm-type compressor; and
a coolant expanding section configured to expand the coolant.

5. A projector comprising the cooler according to claim 4.

* * * * *